United States Patent [19]

Phillips

[11] Patent Number: 5,505,275

[45] Date of Patent: Apr. 9, 1996

[54] POWER STEERING SYSTEM

[75] Inventor: Edward H. Phillips, Troy, Mich.

[73] Assignee: Techo Corporation, Southfield, Mich.

[21] Appl. No.: 322,448

[22] Filed: Oct. 5, 1994

Related U.S. Application Data

[63] Continuation-in-part of Ser. No. 119,281, Sep. 9, 1993.
[51] Int. Cl.$^6$ .............................. B62D 5/083; B62D 5/06
[52] U.S. Cl. ........................... 180/132; 60/431; 180/149
[58] Field of Search ...................... 180/132, 141, 180/142, 149; 60/431

[56] References Cited

U.S. PATENT DOCUMENTS

| | | | |
|---|---|---|---|
| 5,018,432 | 5/1991 | White, Jr. ................................. | 180/149 |
| 5,131,486 | 7/1992 | Kato et al. ............................... | 180/132 |
| 5,207,780 | 5/1993 | Norimatsu et al. ...................... | 180/141 |
| 5,213,174 | 5/1993 | Adams ..................................... | 180/149 |
| 5,396,969 | 3/1995 | Joerg et al. .............................. | 180/132 |

*Primary Examiner*—Mitchell J. Hill
*Attorney, Agent, or Firm*—Gifford, Krass, Groh, Sprinkle, Patmore, Anderson & Citkowski

[57] ABSTRACT

A power steering system (10) for a motor vehicle having a power cylinder with the piston mounted in the power cylinder which divides the power cylinder into first (30) and second (32) chambers. The steering system includes a valve assembly having a rotary input member (40) and a valve sleeve 42 and first and second pairs of open center input valves (18), each which has an inlet and an outlet. The inlets of the input valves are fluidly connected to pump output. The valve assembly further includes a pair of closed center input valves (4b) and a normally closed by-pass valve (50). A hydraulic pump (12) is controlled so as to maintain a constant pressure drop between the inlets and outlets of the closed center valve (4b) and normally closed by-pass valves (50) whereby initial fluid flow through the control valve is proportional to the area of a variable orifice comprised within the normally closed by-pass valve (50). When sufficient torque is applied to the rotary input member (40) one of the closed center valves (46) begins to open whereby total flow through the control valve is proportional to the combined area of orifices comprised within both the opening of closed center valve (4b) and the normally closed by-pass valve (50).

8 Claims, 5 Drawing Sheets

POWER STEERING SYSTEM

CROSS REFERENCE TO RELATED APPLICATIONS

This application is a continuation-in-part of U.S. patent application Ser. No. 08/119,281, filed Sep. 9, 1993 entitled "Improved Boot Strap Power Steering Systems."

BACKGROUND OF THE INVENTION

1. Field of the Invention

The present invention relates to power steering systems.

2. Description of the Prior Art

There are many previously known power steering systems. Virtually all power steering systems include a hydraulic cylinder having a hydraulic piston slidably disposed within the cylinder. The piston is mechanically connected to the steering mechanism of the vehicle so that displacement of the piston within the cylinder simultaneously turns the vehicle's dirigible wheels.

In order to control actuation of the piston within the hydraulic cylinder, typically a valve assembly is provided with the steering system. The valve assembly includes compliantly coupled rotary input and valve sleeve members which are rotatably mounted within a valve housing. The rotary input and valve sleeve members are typically connected to the vehicle's steering wheel and dirigible wheels, respectively. Thus, as torque is applied to the steering wheel, rotational displacement of the rotary input member relative to the valve sleeve occurs and flow control orifices within the valve assembly are selectively opened or closed in order to effect a differential pressure across and/or fluid flow through the power cylinder and, in doing so, enable the power steering function in a well known fashion.

Valve assemblies utilizing an open center valve are most commonly employed in power steering systems. In an open center valve, all flow control orifices have a normally open configuration whereby fluid flow through the valve is allowed even when the rotary input member of the valve is at an "at rest" position. Conversely, when torque is applied to the rotary input member, selected ones of the flow control orifices progressively close. In combination with continuous fluid flow through the valve, this results in increasing system pressure which is substantially coupled to the appropriate side of the hydraulic piston.

Although rarely used, valve assemblies utilizing a closed center valve have also been employed in power steering systems. In such prior art closed center valves all flow control orifices are closed with the rotary input member at an "at rest" position. Thus, in the "at rest" position fluid flow through the valve is substantially precluded. When torque is applied to the rotary input member selected ones of the flow control orifices progressively open and, so long as a sufficiently pressurized source of fluid is present, move the piston at a velocity nominally proportional to the area of the open flow control orifices. Such systems typically utilize an accumulator charged by an intermittently operating pumping subsystem as the pressurized source of fluid.

In order to control actuation of the hydraulic piston within the hydraulic cylinder, valve assemblies typically include four sets of valve orifices (hereinafter called valves) namely two input valves and two output valves, each of which has an inlet and outlet. Typically the inlet of the input valves are fluidly connected to the pump outlet while the outlets from the input valves are fluidly connected to the inlets of the output valves. The outlets from the outlet valves are, in turn, fluidly connected to the inlet of the pump.

One chamber of the power cylinder is then fluidly connected to the junction between one input and one output valve while, similarly, the second fluid chamber in the power cylinder is fluidly connected to the junction of the other input and output valve. Consequently, by proper design of the valve assembly for the power steering system, the input and output valves, are selectively closed or opened progressively in response to a torque applied to the rotary input member by the steering wheel in order to create a differential pressure across and/or fluid flow through the power cylinder chambers. It is the differential pressure which drives the piston and, in turn, provides the desired power assist for steering the vehicle.

The selection of closed center valves or open center valves both have their own advantages and disadvantages. For example, open center valves in the valve assembly provide relatively good control of the steering mechanism, but require constant fluid flow through the valve even when the valve is at an "at rest" position. As such, the pump for a system using open center valves consumes relatively large amounts of power.

Closed center valves, on the other hand, can be much more power efficient than open center valves since the closed center valve prohibits fluid flow (except for minor leakage) when the valve assembly is at an "at rest" position. Such increased efficiency can be realized, even in prior art systems which consume fully pressurized fluid for every steering wheel motion, because total fluid volumes consumed are far less than with valve assemblies using open center valves. However, such prior art systems have not been generally accepted because of undesirable steering feel and safety concerns relating to accumulator storage of relatively large volumes of hydraulic fluid under pressure.

SUMMARY OF THE PRESENT INVENTION

The present invention provides a power steering system utilizing a valve assembly having a closed center valve and an "on demand" hydraulic pumping system which is even more power efficient than the prior art closed center valve equipped systems and overcomes their above-mentioned disadvantages.

In brief, the power steering system of the present invention operates as a boot strap system as disclosed in greater detail in my co-pending patent application Ser. No. 08/119,281, filed Sep. 9, 1993 entitled "Improved Boot Strap Power Steering Systems" and which is incorporated herein by reference.

The "on demand" pumping system includes either a variable displacement pump or a variable speed servo motor driven pump having an inlet and an outlet.

The power steering system typically includes a valve assembly having compliantly coupled rotary input and valve sleeve members which are rotatably mounted within a valve housing. The rotary input and valve sleeve members are connected to the vehicle's steering wheel and dirigible wheels, respectively. In a fashion to be subsequently described in greater detail, torque applied to the steering wheel selectively creates a differential pressure across and/ or fluid flow through the chambers of a hydraulic cylinder to enable the power steering function. Consequently, torque applied to the rotary input member in one rotational direction rotatably drives the vehicle's dirigible wheels in that direction and vice versa.

The valve assembly includes a pair of input open center valves each of which has an inlet and an outlet. The inlets of the input valves are fluidly connected to the pump output. The valve assembly further includes a pair of output open center valves each of which has an inlet and an outlet. The inlet of one output valve is fluidly connected to the outlet of one input valve and, similarly, the inlet of the other output valve is fluidly connected to the outlet of the other input valve. The outlets of both output valves are commonly connected to an "output" node or fluid connection therebetween.

The piston in the power cylinder divides the power cylinder into a first chamber and a second chamber. The first chamber is connected to a first cylinder connection node between one input and output valve while, similarly, the second power cylinder chamber is connected to a second cylinder connection node between the other input and output valves. Consequently, the differential pressure between the cylinder connection nodes drives the piston in the power cylinder at a speed proportional to the differential flow rates through the cylinder connection nodes.

In addition, the valve assembly includes a pair of series connected "high ,speed" open and closed center valves each connected between one of the cylinder connection nodes and an "EVO" node. A normally open solenoid operated electronically variable orifice (EVO) is connected between the EVO node and the output node. The normally open EVO is fully energized at zero speed (i.e., such as when the vehicle is being parked) wherein it is closed and totally decouples the EVO node from the output node. As the vehicle is accelerated to progressively higher speeds the normally open EVO is progressively deenergized and the EVO and output nodes are more fully coupled together to progressively increase steering effort as is fully described in co-pending patent application Ser. No. 08/119,281. Finally, at high vehicular speeds (i.e., above 65 mph) the normally open EVO is fully deenergized. Thus, at high vehicular speeds the normally open EVO directly couples the EVO node to the output node.

The valve assembly further includes a pair of mirror imaged closed center valves. One of mirror imaged closed center valves opens when torque is applied to the rotary input member in a first direction and the other when torque is applied in the other direction. The closed center valves are fluidly connected between the output node and the inlet to the hydraulic pump. In addition, the present invention provides an additional normally closed EVO connected in parallel with the closed center valves. The series disposition of the parallel connected closed center valves and normally closed EVO prevents fluid flow, except for minor leakage, through the power steering system at high vehicular speeds when the steering wheel and its attached rotary input member are at an "at rest" condition. This is because both the closed center valves and normally closed EVO are closed under these conditions.

The normally open and normally closed EVOs are both connected to the output node. Thus, for reasons of economy, the normally open and normally closed EVOs are normally formed as two flow control orifices of a single solenoid operated, three-way EVO whose common port is connected to the output node.

An "on demand" pumping system normally utilized in conjunction in the power steering system of the present invention is also disclosed in co-pending patent application Ser. No. 08/119,281. As fully described therein, the "on demand" pumping system is controlled so as to provide a flow of fluid such that a nominal pressure (i.e., 20 p.s.i.) is maintained across the parallel connected closed center valves and normally closed EVO under all normally encountered operating conditions (including the above-mentioned zero flow condition). Thus, at other than the zero flow condition, the flow of pressurized fluid through the valve assembly is proportional to the combined areas of flow control orifices of an open one of the closed center valves (when one of them is open in response to an applied torque) and the normally closed EVO (i.e., at other than the above-mentioned high vehicular speed condition where it is closed) regardless of differential pressure between and/or flow through the cylinder connection nodes.

In operation, the normally closed EVO provides varying amounts of fluid flow through the valve assembly whenever it is energized. The fluid flow has a maximum value at zero speed and progressively decreases as the vehicle is operated at progressively higher speeds. This results in significant levels of on-center differential pressure gain between the cylinder connection nodes during parking and low speed maneuvering, decreasing to zero on-center differential pressure gain at high speeds. The orifice defining the normally closed EVO is formed in a triangular manner so that the resulting orifice area is a quadratic function of the level of energization of the normally closed EVO. Thus, the on-center fluid flow through the valve assembly and resulting on-center differential pressure gain smoothly decrease to zero values as vehicular speed increases.

In order to prevent possible cylinder cavitation, check valves fluidly connect the pump inlet to the cylinder connection nodes. Should the steering wheel undergo a sharp transition to zero applied torque when exiting a turn, the lower pressure one of the cylinder connection nodes could otherwise be subjected to negative pressure values.

To protect against over-pressure at the output node, a supply pressure regulating valve is utilized in the steering system of the present invention. The supply pressure regulating valve includes a valve spool acted on a first end by pressure conveyed from the output node (i.e., "sensing pressure" as described in co-pending patent application Ser. No. 08/119,281) and the other by a compression spring and any pressure present at the pump inlet. A central groove in the spool acts in conjunction with ports connected to the pump outlet and inlet to provide metered relief fluid flow therebetween in the event that the pressure present at the outlet node would otherwise become excessive. This allows the "on demand" pumping system to be configured without a dynamic braking sub-system. This means that excess pumped fluid flowing from the pump outlet after a sudden release of the steering wheel by a driver merely flows as metered relief flow. Further, should an "on demand" pumping system failure resulting in full pump speed occur, metered relief flow will merely convey all excess pumped fluid back to the pump inlet. In fact, the supply pressure regulating valve even allows the valve assembly to be utilized with a standard full flow power steering pump.

The flow of sensing fluid conveying sensing pressure from the output node to the first end of the spool is interrupted by a first control orifice. This presents a "resistive flow impedance" to the flow of sensing fluid. In conjunction with the compliance of the spring at the other end, this resistive flow impedance results in a quasi "RC" time constant in the resulting control function. If an increase in the resistive flow impedance and resulting RC time constant values is desired, a second (and generally smaller) control orifice is introduced to allow fluid flow between the first end of the spool and the pump inlet. This allows fluid to concomitantly flow through the sensing orifice. This significantly increases the resistive flow impedance value of the sensing system because pressure drop across an orifice is a quadratic function and, as will be fully described below, resulting resistive flow impedance value is proportional to flow therethrough.

BRIEF DESCRIPTION OF THE DRAWING

A better understanding of the present invention will be had upon reference to the following detailed description when read in conjunction with the accompanied drawing, wherein like reference characters refer to like parts throughout the several views, in which:

FIG. 2b is a sectional view taken along line 2b—2b in FIG. 2a;

DETAILED DESCRIPTION OF A PREFERRED EMBODIMENT OF THE PRESENT INVENTION

Figure 1:
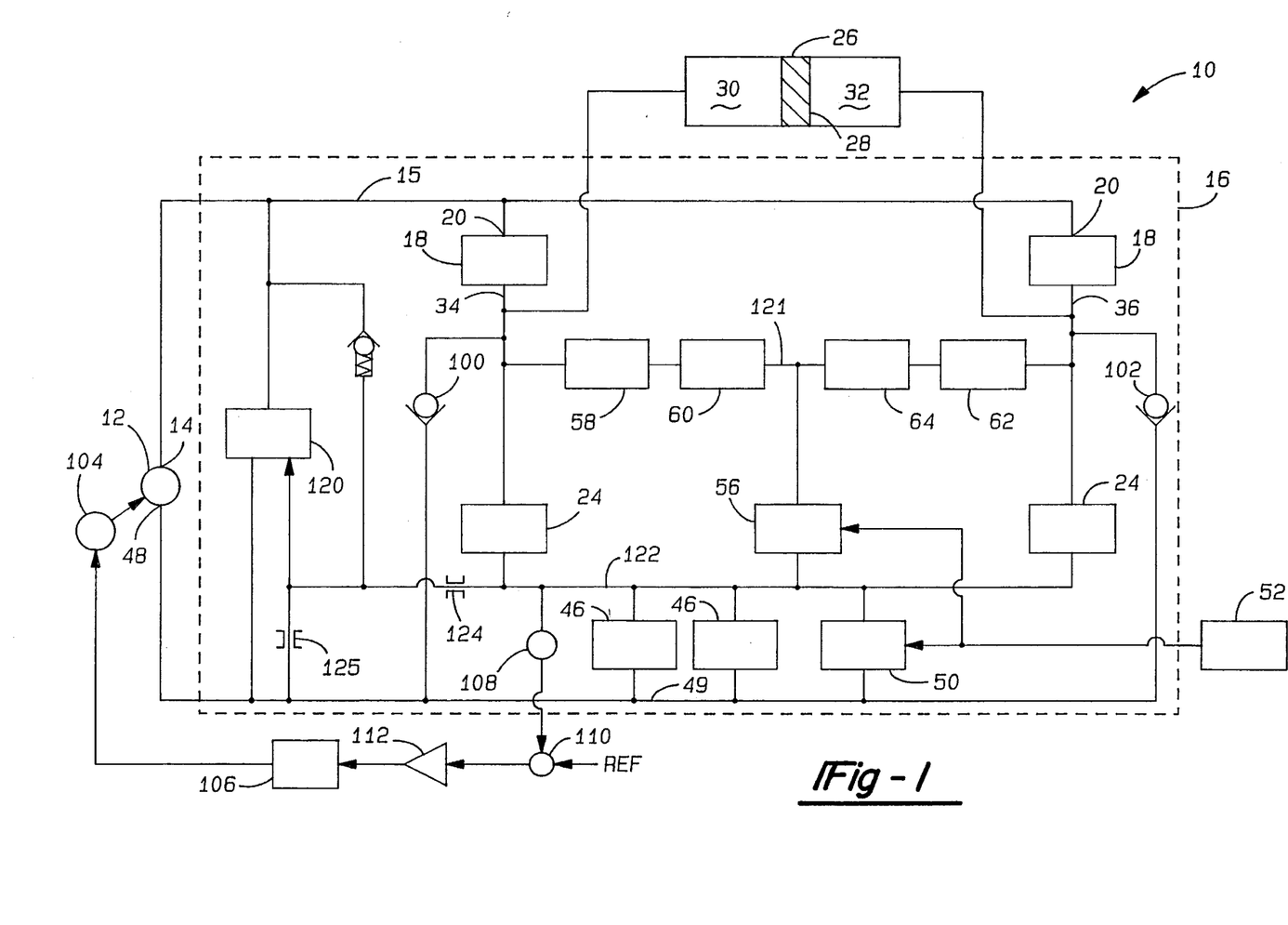
FIG. 1 is a block diagrammatic view illustrating a preferred embodiment of the power steering system of the present invention.

With reference first to FIG. 1, a block diagrammatic view of a preferred embodiment of the power steering system 10 of the present invention is thereshown and comprises a hydraulic pump 12 which produces pressurized hydraulic fluid at its output 14. The pump output 14 is, in turn, fluidly connected to a valve assembly 16 via input node 15.

Still referring to FIG. 1, the valve assembly 16 comprises a pair of open center input valves 18 each of which has their input 20 fluidly connected to the input node 15. The outlet of one inlet valve 18 is connected to the input of an open center output valve 24 and, similarly, the outlet of the other inlet valve 18 is connected 16 the inlet of a second open center output valve 24.

In order to provide the desired power assist for the vehicle steering, the power steering system 10 includes a power cylinder 26 having a piston 28 which divides the cylinder 26 into a first chamber 30 and a second chamber 32. The first chamber 30 is fluidly connected to a cylinder connection node 34 between one pair of input valve 18 and output valve 24 while, similarly, the second chamber 32 is connected to another cylinder connection node 36 between the other pair of input valve 18 and output valve 24. The piston 28, in turn, is mechanically connected to the steering mechanism for the vehicle so that movement of the piston 28 (or equivalent) occurs in union with turning of the vehicle's steering wheel.

In the well known fashion, the input valves 18 and output valves 24 are variably restricted in order to create a differential pressure between the cylinder connection node 34 connected to fluid chamber 30 and the cylinder connection node 36 connected to the chamber 32. Any such differential pressure, of course, causes the piston 28 to move relative to the cylinder 26 and thus mm the vehicle wheels.

Figure 2A:
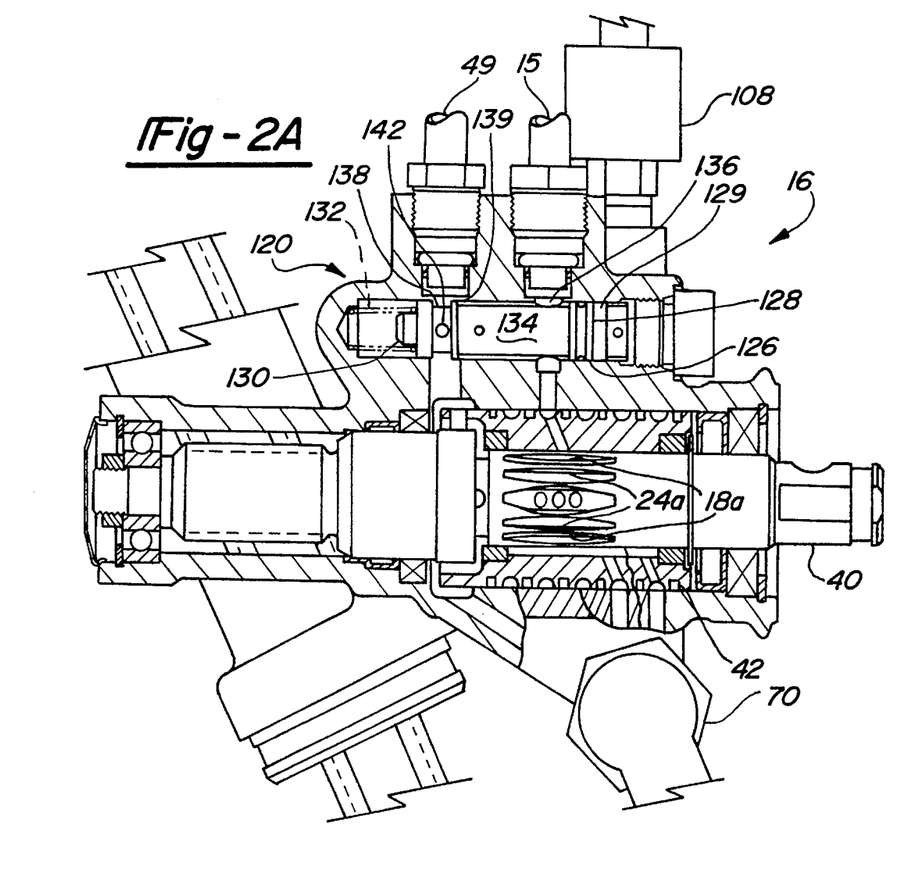
FIG. 2a is a longitudinal sectional view of an exemplary valve assembly in the preferred embodiment of the invention.
Figure 2B:
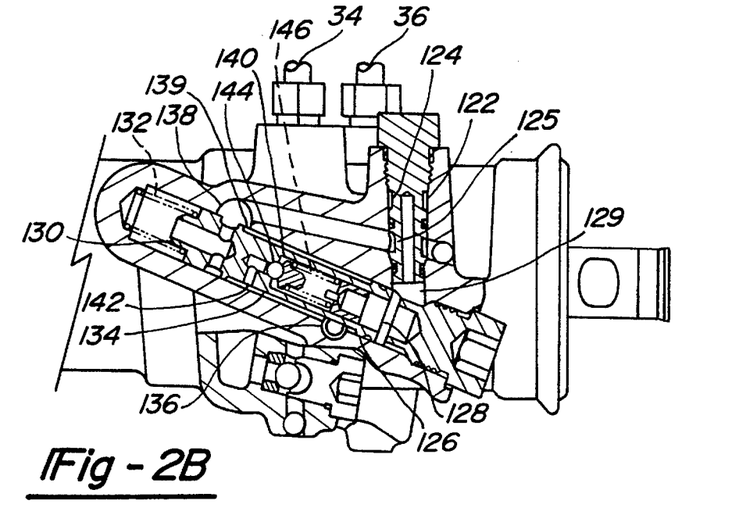

With reference now to FIGS. 2a and 2b, a preferred embodiment of the valve assembly 16 is thereshown comprising metering lands 18a and 24a which in conjunction with slots formed in valve sleeve 42 form orifices corresponding to the input valves 18 and the output valves 24, respectively. The valve member 16 includes a rotary input member 40 which typically is mechanically connected to the steering wheel. As torque is applied to the rotary input member 40 in one direction or the other, relative motion occurs between the rotary input member 40 and the valve sleeve 42 which variably opens or closes to the orifices corresponding to the input valves 18 and output valves 24 in order to create the differential pressure between the nodes 34 and 36. Reference should be had to the parent application (which has been incorporated by reference) for a more detailed description of the construction of the valve assembly 16.

With reference again to FIG. 1, the valve assembly 16 further includes first and second closed center valves 46 which are fluidly connected in series between the outlets from the output vanes 24 at an output node 122 and an inlet 48 to the pump 12 via a return node 49. Thus, assuming that the valve assembly 16 is at an "at rest" condition (i.e. no torque is applied to the rotary input member 40 of the valve assembly 16), the closed center valves 46 are in fact closed and prevent fluid flow through the valve assembly 16, except for leakage amounts.

Figure 8:
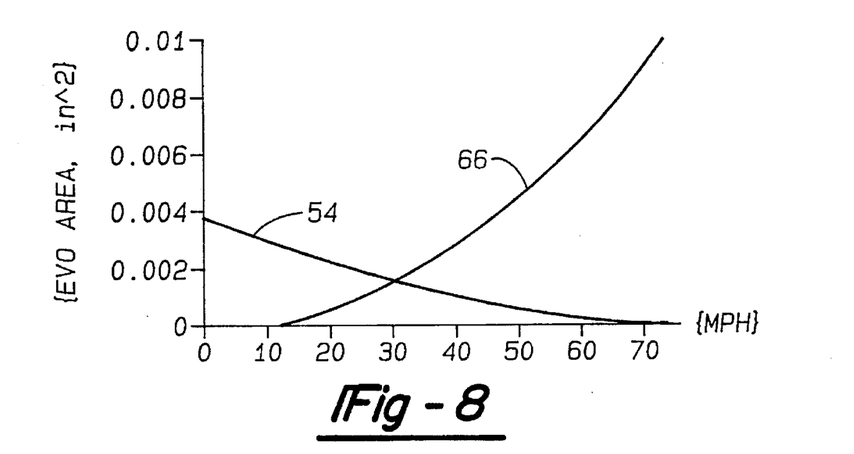
FIG. 8 is a graph illustrating the operation of the EVO.

In order to provide generally lower input torque values for power steering system 10 during parking, the valve assembly 16 of the present invention includes an electronically variable orifice (EVO) 50 which, in response to a signal from a vehicle speed sensor 52 moves from an open position to a closed position as a function of vehicle speed as indicated by curve 54 in FIG. 8. Consequently, at low vehicle speeds, the EVO 50 ensures that there is increased hydraulic fluid flow through the vane assembly 16 thereby increasing hydraulic pressure gain and providing increased values of available load flow (i.e., through power cylinder 26) for all values of input torque for parking or maneuvering at low vehicle speeds.

The EVO 50 is a normally closed valve, but is fully energized to an open position at zero vehicular speed. The EVO 50 is progressively deenergized with increasing vehicular speed and thus progressively closes with increasing vehicle speed.

Referring again to FIG. 1, the vane assembly 16 also further comprises a second EVO 56. The inlet of the EVO 56 is fluidly connected in series between an "EVO" node 121 and output node 122. A first pair of open and closed center valves 58 and 60, respectively, are connected in series between the node 34 and EVO node 12 1. Similarly, a second pair of open and closed center valves 62 and 64, respectively, are fluidly connected in series between the node 36 and the EVO node 121. The outlet of the EVO 56 is connected to the output node 122.

The normally open EVO 56 also is actuated as a function of vehicle speed. However, unlike the EVO 50, the EVO 56 is closed when fully energized and progressively opens as it is deenergized as a function of vehicle speed as indicated by curve 66 in FIG. 8. As is more fully described in the parent application, the EVO 56, together, with its associated valves 58–64 serves to linearize the load versus torque function of the valve assembly 16 of the power steering system 10 at higher vehicle speeds and, in doing so, provides a greater tactile feel and feedback for the power steering system.

Figure 3:
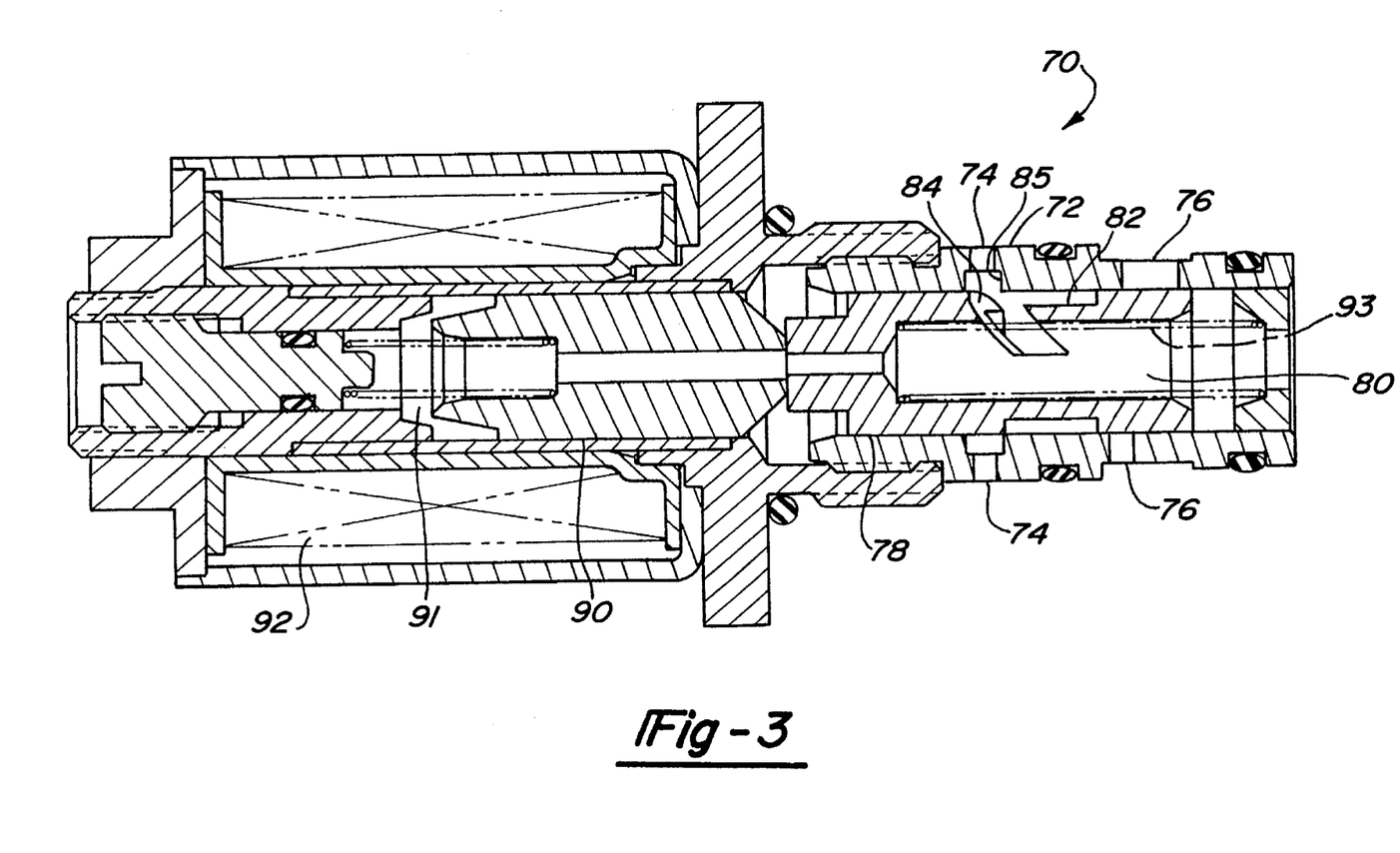
FIG. 3 is a longitudinal sectional view illustrating a preferred embodiment of the electronically (EVO) variable orifice of the present invention in a first position.

Preferably, the EVO 50 and EVO 56 are comprised in a single three-way valve 70 as indicated in FIG. 2a. With reference then to FIG. 3, a preferred embodiment of the three-way valve 70 which forms the EVO's 50 and 56 is thereshown. The three-way valve 70 includes a cage housing 72 having first fluid ports 74 which are fluidly connected to the return node 49. An array of second ports 76 through the cage housing 72 is fluidly connected to the EVO node 1.21.

Still referring to FIG. 3, a valve spool member 78 is slidably disposed within the housing 72 and has a fluid port 80 fluidly connected to the output node 122 (FIG. 1) and thus to the common connection between the EVOs 56 and 50. This fluid port 80 is, in turn, fluidly connected to slots 84 and to a groove 82. The slots 84 variably register with an internal groove 85 formed in the housing 72 such that it is fluidly connected to first fluid ports 74. The slots 84 and groove 82, by selectively registering with the internal groove 85 and ports 76, respectively, variably fluidly connect the fluid port 80 to the fluid ports 74 and 76 depending upon the axial position of the valve member 78 in the housing 72.

Figure 4:
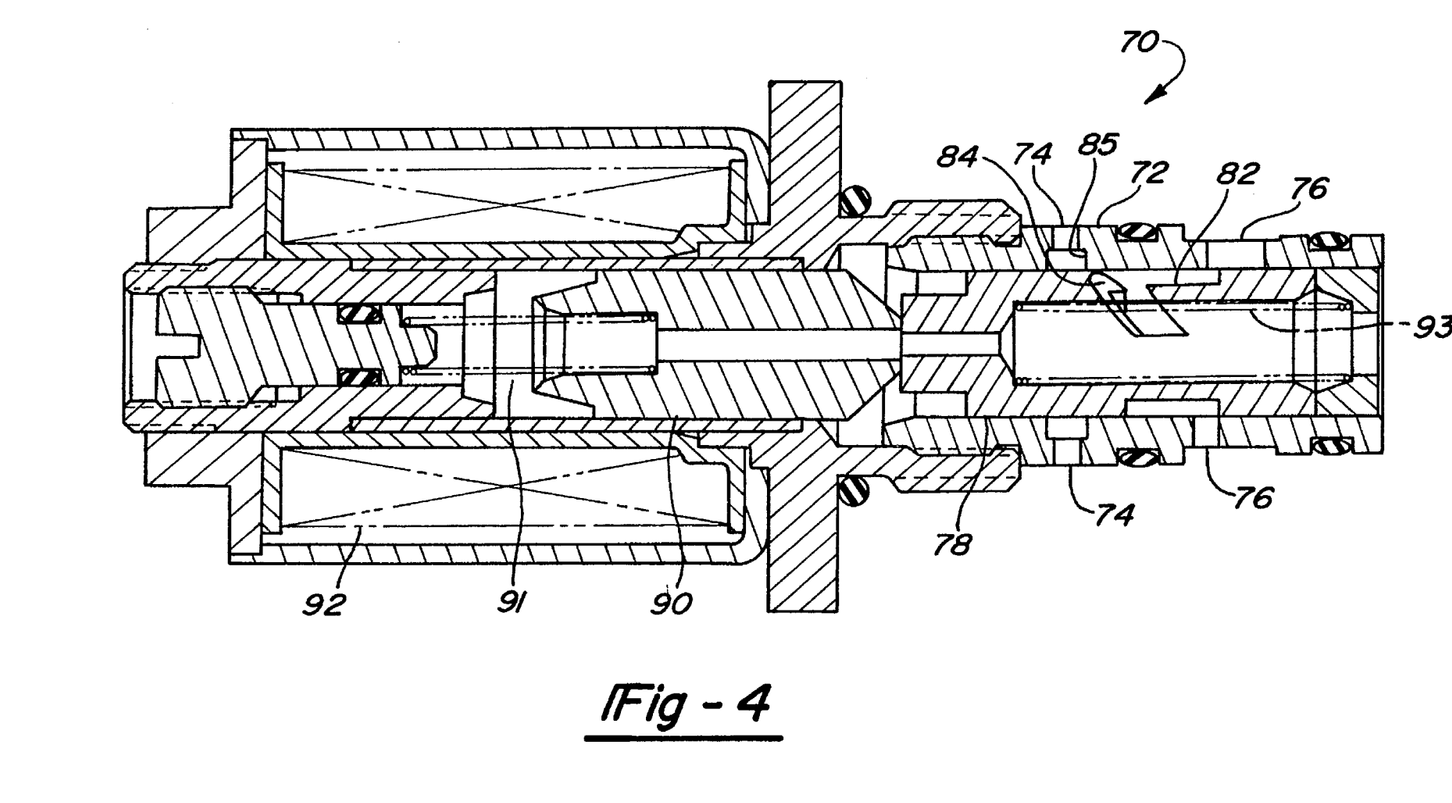
FIG. 4 is a view similar to FIG. 3 illustrating the EVO in a different position.

With reference then to FIGS. 3 and 4, with the valve member 78 in the fully energized position illustrated in FIG. 3, the fluid port 80 is fluidly connected with the fluid ports 74 while the fluid ports 76 are fluidly disconnected from the fluid port 80. Such a situation would occur, for example, during parking maneuvers or very low speed vehicle operation.

Conversely, during a higher speed vehicle operation, the EVOs 50 and 56 are deenergized and the valve member 78 shifts to the position illustrated in FIG. 4 in which the fluid ports 80 and 76 are fluidly connected together while the fluid port 80 is fluidly disconnected from the fluid port 74. Such a situation would occur during high ! speed operation of the vehicle.

Figures 5, 6, 7:
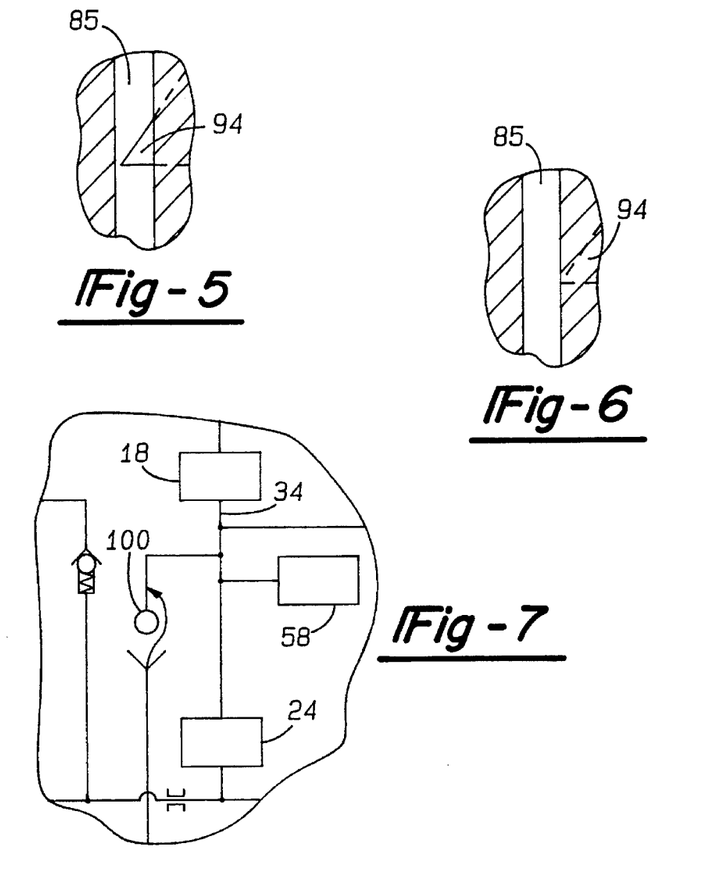
FIG. 5 is a fragmentary view illustrating the opening of one of the orifices in the EVO corresponding to the position illustrated in FIG. 3.
FIG. 6 is similar to FIG. 5 but illustrating the opening corresponding to FIG. 4.
FIG. 7 is a block diagrammatic view illustrating one condition for the power steering system.

In order to control the actuation of the valve member 78, an electromagnetic plunger 90 is connected to the valve member 78 via the urging of compression springs 91 and 93. The position of the plunger 90 in turn is controlled by an electromagnetic coil 92 which, when energized, operates against the differential force provided by the compression springs 91 and 93. With reference now to FIGS. 3 and 4, preferably each slot 84 in the valve member 78 is cut diagonally with respect to the axis of the valve member 78. As such, the portion of the slots 84 which register with the internal groove 85 is triangular in shape as shown at 94 in FIGS. 5 and 6. Consequently, as the valve member 78 moves from the position shown in FIG. 3 and towards the position shown in FIG. 4, the triangular opening 94 decreases from the position shown in FIG. 5 to a completely obscured position as shown in FIG. 6. In doing so, the area of the triangular opening 94 decreases as a function of the square of the travel of the valve 78 which, in turn, tends to optimize translation of the operation of the power steering system 10 from high gain at low vehicle speeds to low or even zero gain at higher vehicle speeds.

Referring now to FIGS. 1 and 7, in some situations, the power steering system 10 undergoes a sharp transition between a high tire load—high torque condition and a high tire load—no torque condition. Such a situation would arise, for example, during a turn of the vehicle wherein significant lateral acceleration is incurred in which the wheels impose a load on the power cylinder which, in turn, is offset by the torque on the steering wheel. A subsequent release of the steering wheel, however, causes the closed center valve 46 to close but, at the same time, the load from the vehicle wheels will attempt to return the piston 28 to a center position. In the previously known open-center systems, fluid flow through their power cylinders as herein between the chambers 30 and 32 necessary to allow the return of the piston 28 to a center position is provided by selective redistribution of the continuous fluid flow through their control valves. In this particular case, however, there is no fluid flow through valve assembly 16 whereby flow through power cylinder 26 must occur through a parallel arrangement of the two input valves 18 in series and the two output valves 24 in series. Because of this, one of the nodes 34 or 36 will be at a high pressure and the other at a low or even negative pressure which can result in cavitation at the low pressure one of nodes 34 or 36.

In order to prevent such cavitation during such a driving situation, the present invention provides a one-way valve 100 between the return node 49 and the node 34 and, similarly, a second one-way valve 102 between the return node 49 and the node 36. Whenever a negative pressure occurs in either of the chambers 30 or 32 of the power cylinder 26, the corresponding one-way valve 100 or 102 (FIG. 2b) opens as shown in FIGS. 7 and 2b. This allows fluid to be directly inducted from the return node 49, into the chamber 30 or 32 of the power cylinder 26 via nodes 34 or 36, respectively. Thus, the valves 100 and 102 effectively eliminate cavitation within the hydraulic system 10.

Referring again to FIG. 1, the hydraulic pump 12 is preferably powered by an electric motor 104 whose speed is controlled by a motor control circuit 106. In a preferred embodiment the electric motor 104 is a brushless dc motor and the motor control circuit 106 is bridge inverter operated in a six step mode. A pressure transducer 108 then provides its output signal through a summing junction 110 having a second reference input and the summing junction 110 provides an input signal to the control circuit 106 via an amplifier 112. The amplifier 112 is a power amplifier whose output voltage is controlled in response to variations in the output signal from the pressure transducer 108 as it monitors the pressure at output node 122. In operation, the hydraulic pump 12 is controlled such that it maintains the pressure at output node 122 at a substantially constant control pressure, e.g. 20 p.s.i., despite variable torque inputs to the rotary input member 40 which impose varying system flow rate demands.

In the case of a sudden release of torque applied to the rotary input member 40, however, the hydraulic pump 12 may not be able to slow rapidly enough to maintain the instant pressure at output node 122 at its relatively low normal control pressure value due to pump rotor inertia. Should this happen, there would be excessive flow through the input valves 18 which would result in excessive pressure gain. This problem could be solved via the implementation of a dynamic brake to slow the electric motor 104 as quickly as it can be accelerated. However, this would involve additional electronic hardware and would not protect the system from any other possible operational mode wherein excess fluid was provided to valve assembly 16.

In order to prevent such excessive flow through the input valves 18, a supply pressure regulating valve 120 is preferably fluidly connected in parallel with the hydraulic pump 12 as from its outlet 14 to its inlet 48. In a preferred embodiment this is done within the valve assembly 16 between input node 15 and return node 49. The regulating valve 120 receives a pilot pressure from output node 122 via a restricted orifice 124 such that the regulating valve opens whenever the pressure at output node 122 exceeds a preset amount, e.g. 23 p.s.i. The regulating valve 120 can be of any conventional construction, but preferably as shown in FIG. 2a and 2b is a spool valve 126 acted on a first end 128 by pressure from output node 122 via orifice 124 to control node 129 and the other end 130 by a compression spring 132 and any pressure present at return node 49. A central groove 134 in spool valve 126 acts in conjunction with ports 136 and 138 connected to input node 15 and return node 49, respectively, to provide metered relief fluid flow therebetween through a metering orifice 139 in the event the pressure present at output node 122 exceeds the preset amount.

The restrictive orifice 124, together with an optional restricted orifice 125 presents a dynamic resistive flow impedance (i.e., similar to an "ac" resistance in electronics) which, together with the volumetric compliance of the ratio of the square of the end area of the spool valve 126 divided by the spring rate of the spring 132, results in a quasi "RC" time constant of the control pressure function. Proper selection of this quasi "RC" time constant enables stabilization of the operation of power steering system 10. Use of the optional restricted orifice 125 results in fluid flow from output node 122 through restrictive orifice 124 to control node 129, and then through restricted orifice 125 to return node 49 via the port 138. This significantly raises the value of the dynamic resistive flow impedance portion of the "RC" time constant because of the non-linear pressure-flow relationship of any restrictive orifice wherein its resistive flow impedance varies as a function of the fluid flow value therethrough according to the following equation:

$$R_h = (\rho Q)/(C_d A)^2 = Sqrt[2\rho P]/(C_d A) \quad (1)$$

where $R_h$ is the resistive flow impedance, $\rho$ is the fluid density, Q is the fluid flow rate, $C_d$ is the orifice discharge coefficient, A is the net orifice area and P is the pressure drop across the orifice associated with the particular flow rate Q.

In systems not comprising the optional orifice 125, Q and P have minuscule values because flow is associated only with actual motion of the spool valve 126. Usually, when an optional orifice 125 is utilized, very small flow values therethrough are sufficient to achieve stability in the operation of power steering system 10. In such cases the optional orifice 125 is a much smaller orifice than the orifice 124 and is formed of a minimum practical size with reference to practical forming methods and resistance to clogging by normally encountered fluid contamination particles. Because of the much smaller size of optional orifice 125, its resistive flow impedance is quite large with respect to the required effective value of resistive flow impedance and may be ignored in selecting the size of orifice 124 according to the following procedure: Use equation (1) with reference to the selected size of optional orifice 125 to determine Q. Then algebraically manipulate equation (1) utilizing that value of Q to determine the required size of orifice 124 (i.e., with required value of resistive flow impedance a known value).

On the other hand, should the required value of resistive flow impedance for a particular application be a significantly larger value, a parallel arrangement of orifices 124 and 125 must be utilized for the calculations. In this case the flow impedance is found by $$R_h = (Sqrt[2\rho]C_d)(Sqrt[P_{124}P_{125}])/(A_{125}Sqrt[P_{124}] + A_{124}Sqrt[P_{125}])(2)$$

where $P_{124}$, $P_{125}$, $A_{124}$ and $A_{125}$ are pressure drops and net orifice areas associated with the orifices 124 and 125 as indicated by their subscripts. Assuming a fixed value of pressure at output node 122, a maximum flow impedance value may be obtained by configuring both of the orifices 124 and 125 of identical minimum practical sizes in which case equation (2) reduces to $$R_h = Sqrt[\rho P)/2]/(C_d A) \quad (3)$$

where P and A are pressure drop and net orifice area associated with either of the orifices 124 or 125.

In addition, the spool valve 126 comprises a pilot operated relief valve 140 as particularly shown in FIG. 2b. When pressure from the input node 15 present in the central groove 134 and Via port 142 is sufficient to lift ball 144 against force provided by compression spring 146, fluid flows therefrom through first end 128 to control node 129 and increases pressure upon first end 128 thus opening metering orifice 139 to provide metered relief flow sufficient to maintain pressure at the input node 15 at a preset maximum value, e.g. 1400 p.s.i.

From the foregoing, it can be seen that the present invention provides a unique power steering system which overcomes many disadvantages of the previously known systems.

Having described my invention, however, any modifications thereto will become apparent to those skilled in the an to which it pertains without deviation from the spirit of the invention as defined by the scope of the appended claims.

I claim:

1. A power steering system for a motor vehicle of the type having a power cylinder, a piston mounted in the power cylinder and dividing the power cylinder into a first and second chamber, said power steering system comprising:

a source of pressurized fluid having an input and an output, means for maintaining a fluid pressure between said input and said output, a valve assembly comprising a rotary input member, a pair of input open center valves, each having an inlet and an outlet, said inlets of said input valves being fluidly connected to said pressurized fluid source output, a pair of output open center valves each having an inlet and an outlet, said inlet of one output valve being fluidly connected to said outlet of one input valve and the inlet of the other output valve being fluidly connected to said outlet of the other input valve, a closed center valve connected in series with said pairs of said open center valves and said source of pressurized fluid, means for fluidly connecting said outlet of one input valve to the first chamber of the power cylinder and for fluidly connecting said outlet of the other input valve to the second chamber of the power cylinder, wherein said open center valves variably close and said closed center valve variably open progressively with torque applied to said rotary input member to create a differential pressure between said chambers of said power cylinder, means for sensing speed of the vehicle, bypass valve means connected in parallel with said closed center valve, and means responsive to said speed sensing means for actuating said bypass valve means from an open to a closed position in an amount related to vehicle speed.

2. The invention as defined in claim 1 and further comprising second bypass valve means connected in parallel between said output valves, and means responsive to said speed sensing means for actuating said second bypass valve from a closed to an open position in an amount proportional to vehicle speed.

3. The invention as defined in claim 2 and comprising an open center high speed valve and a closed center high speed valve fluidly connected in series between each cylinder chamber and an inlet to said second bypass valve means.

4. The invention as defined in claim 2 wherein said normally open bypass valve and said normally closed bypass valve are comprised in a three way valve.

5. The invention as defined in claim 4 wherein said three way valve comprises a housing having a bore, a valve member movably mounted within said bore between a first and second position, fast and second fluid ports formed through said housing and axially spaced from each other and a third fluid port open to an interior of said bore wherein said valve member variably opens and closes said first and second fluid ports in dependence on the position of said valve member in said bore.

6. The invention as defined in claim 5 wherein the area of opening of said first port varies as a function of the square of the axial movement of said valve member.

7. A power steering system for a motor vehicle of the type having a power cylinder, a piston mounted in the power cylinder and dividing the power cylinder into a first and second chamber, said power steering system comprising:

- a source of pressurized fluid having an input and an output,
- means for maintaining a fluid pressure between said input and said output,
- a valve assembly comprising
  - a rotary input member,
  - a pair of input open center valves, each having an inlet and an outlet, said inlets of said input valves being fluidly connected to said pressurized fluid source output,
  - a pair of output open center valves each having an inlet and an outlet, said inlet of one output valve being fluidly connected to said outlet of one input valve and the inlet of the other output valve being fluidly connected to said outlet of the other input valve,
  - a closed center valve connected in series with said pairs of said open center valves and said source of pressurized fluid,
  - means for fluidly connecting said outlet of one input valve to the first chamber of the power cylinder and for fluidly connecting said outlet of the other input valve to the second chamber of the power cylinder,
  - wherein said open center valves variably close and said closed center valve variably open progressively with torque applied to said rotary input member to create a differential pressure between said chambers of said power cylinder,
- first one way valve means connected between said outlet of said closed center valve and said first chamber of the power cylinder to enable fluid flow between said outlet of said closed center valve and said first chamber when the fluid pressure in said first chamber falls below a preset value, and
- second one way valve means connected between said outlet of said closed center valve and said second chamber of the power cylinder to enable fluid flow between said outlet of said closed center vane and said second chamber when the fluid pressure in said second chamber falls below a preset value.

8. A power steering system for a motor vehicle of the type having a power cylinder, a piston mounted in the power cylinder and dividing the power cylinder into a first and second chamber, said power steering system comprising:

- a source of pressurized fluid having an input and an output,
- means for maintaining a fluid pressure between said input and said output,
- a valve assembly comprising
  - a rotary input member,
  - a pair of input open center valves, each having an inlet and an outlet, said inlets of said input valves being fluidly connected to said pressurized fluid source output,
  - a pair of output open center valves each having an inlet and an outlet, said inlet of one output valve being fluidly connected to said outlet of one input valve and the inlet of the other output valve being fluidly connected to said outlet of the other input valve,
  - a closed center valve connected in series with said pairs of said open center valves and said source of pressurized fluid,
- means for fluidly connecting said outlet of one input valve to the first chamber of the power cylinder and for fluidly connecting said outlet of the other input valve to the second chamber of the power cylinder,
- wherein said open center vanes variably close and said closed center valve variably open progressively with torque applied to said rotary input member to create a differential pressure between said chambers of said power cylinder,
- supply pressure regulating valve means for fluidly connecting said source output to said source input whenever the pressure across said closed center valve exceeds a predetermined amount.

* * * * *